United States Patent [19]

Takahashi et al.

[11] Patent Number: 4,807,060
[45] Date of Patent: Feb. 21, 1989

[54] MILTI-CHANNEL RECORDING APPARATUS FOR A PLURALITY OF PROGRAMS

[75] Inventors: Koji Takahashi; Toshiyuki Masui, both of Kanagawa, Japan

[73] Assignee: Canon Kabushiki Kaisha, Tokyo, Japan

[21] Appl. No.: 944,876

[22] Filed: Dec. 22, 1986

[30] Foreign Application Priority Data

Dec. 27, 1985 [JP] Japan ................................. 60-292536
May 15, 1986 [JP] Japan ................................. 61-109686

[51] Int. Cl.⁴ ............... G11B 15/18/5/02; H04N 5/78
[52] U.S. Cl. .................................. 360/72.2; 360/10.1; 360/21
[58] Field of Search ................... 360/69, 72.2, 8, 10.1, 360/21

[56] References Cited

U.S. PATENT DOCUMENTS 4,642,705  2/1987  Lemelson ............................... 360/21
4,766,507  8/1988  Kashida et al. ...................... 360/72.2

Primary Examiner—Robert S. Tupper
Attorney, Agent, or Firm—Robin, Blecker & Daley

[57] ABSTRACT

A multi-channel recording apparatus capable of recording information signals in a plurality of areas on a recording medium, having a function to record, in connection with a first instruction information for change-over of the recording areas, a second instruction information concerning the recording area to be selected after the change-over, together with the information signal to be recorded in the area.

25 Claims, 11 Drawing Sheets

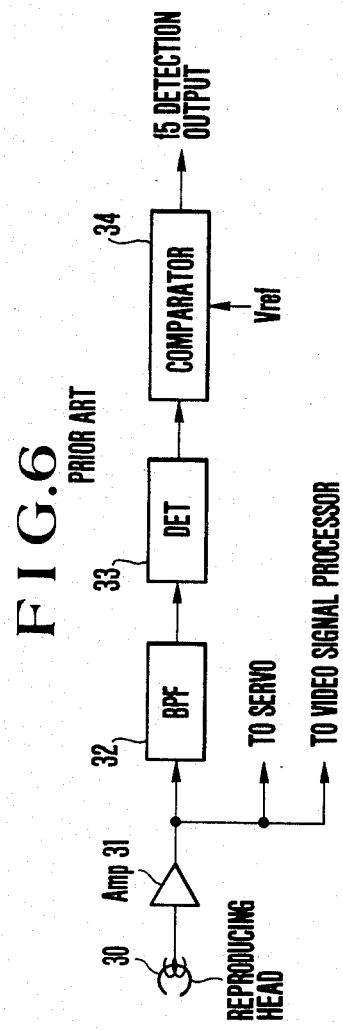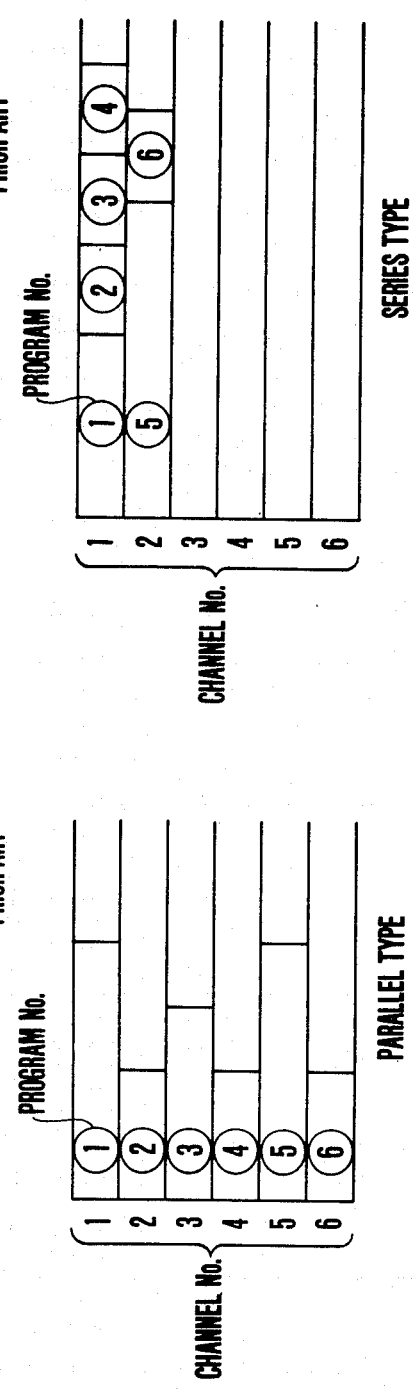

FIG. 9

| ID No. \ BIT No. | 7 | 6 | 5 | 4 | 3 | 2 | 1 | 0 |
|---|---|---|---|---|---|---|---|---|
| ID0 | 0 | 0 | 0 | 0 | 0 | 1 | 1 | 1 |
| ID1 | 1 IMMEDIATELY BEFORE CHANGE-OVER OF RECORDING AREA 0.3–1 SEC. (ORDINARY TIME) | TAPE RUNNING DIRECTION FOR NEXT CHANNEL / CUE MARK | NEXT CHANNEL START POSITION / BLANK MARK | 1 | 0 | NEXT CHANNEL No. / TAPE RUNNING SPEED | | TAPE RUNNING DIRECTION OF PRESENT CHANNEL / TAPE RUNNING DIRECTION ON PRESENT TRACK |
| ID2 | CONTROL BIT | | | | | | | |
| ID3 | YEAR, MONTH, DATE, DAY OF WEEK, HOUR, MINUTE, SECOND | | | | | | | |
| ID3 | PROGRAM No. OR C. No. (ORDER OF 1) | | | | | | | |
| ID4 | C/P | PROGRAM No. OR C. No. (ORDER OF 10) | | | | | | |

FIG. 10

| ID MODE | ID0 | ID1 | ID2 | ID3 | ID4 | ID5 | REMARKS |
|---|---|---|---|---|---|---|---|
| 1 | 1 | HOUR | MINUTE | SECOND | Frame/No. | Y | COUNTER |
| 2 | 2 | Pro./No. | CUT/No. | MINUTE | SECOND | Y | CUT DATA |
| 3 | 3 | YEAR | MONTH | DATE | DAY OF WEEK | Y | TIME |
| 4 | 4 | HOUR | MINUTE | SECOND | Frame/No. | Y | TIME |
| 5 | 5 | Pro./No. | HOUR | MINUTE | SECOND | Y | PROGRAM DATA |
| 6 | 6 | Pro./No. | HOUR | MINUTE | SECOND | Y | TAPE DATA |
| 7 | 7 | REFER TO FIG. 9 | | | | Y | MULTI-CHANNEL DATA |

FIG. 11

| bit.No. | ID5 (Y) IN EACH MODE |
|---|---|
| 0 | VALIDITY |
| 1 | FORM OF AUDIO SIGNAL |
| 2 | |
| 3 | Lch AUDIO/OTHERS |
| 4 | Rch AUDIO/OTHERS |
| 5 | RECORDING START POSITION |
| 6 | RECORDING STOP POSITION |
| 7 | PREVENTION OF DUBBING |

FIG. 14(a)

| Video | Video | Audio 4 |
|-------|-------|---------|
|       |       | A5      |
|       |       | A3      |
|       |       | A6      |
|       |       | A1      |
| PCM   | PCM   | A2      |

FIG. 14(b)

| PROGRAM No. | CHANNEL No. | RECORDING START TIME | RECORDING TIME | RECORDING START POINT |
|-------------|-------------|----------------------|----------------|-----------------------|

⏟ memory unit

FIG. 14(c)

| Video | Video | Audio 4 | | |
|-------|-------|---------|----|----|
|       |       | A5      | A2 |    |
|       |       | A3      | A9 | A1 |
|       |       | A6      |    |    |
|       |       | A7      |    |    |
| PCM   | PCM   | A8      |    |    |

FIG. 14(d)

| Video | Video | Audio 4 | | |
|-------|-------|---------|----|----|
|       |       | A5      | A2 |    |
|       |       | A3      | A9 | A1 |
|       |       | A6      |    |    |
|       |       | A7      |    |    |
| PCM   | PCM   | A8      |    |    |

MILTI-CHANNEL RECORDING APPARATUS FOR A PLURALITY OF PROGRAMS

BACKGROUND OF THE INVENTION

1. Field of the Invention

The present invention relates to a recording apparatus adapted for recording information signals in different areas of a recording medium.

Description of the Related Art

Throughout the specification, the recording apparatus will be described, by way of example, as being a multi-channel digital audio tape recorder in which audio signals which are compressed in terms of time axis are modulated and recorded independently in 6 channels which extend in the longitudinal direction of a magnetic tape by means of rotary heads.

FIG. 1 shows a part of a tape running system which is used in this type of digital audio tape recorder. In FIG. 1, reference numerial 1 denotes a magnetic tape, 2 denotes a rotary cylinder, and 3 and 4 denote rotary heads carried by the rotary cylinder 2. As the rotary cylinder 2 rotates, each of the heads 3 and 4 obliquely traces the tape 1 so as to record audio digital signals. The arrangement is such that audio signals compressed in terms of time axis are recorded in six areas extending along the length of the tape 1, for each 36° rotation of the heads 3,4, thus realizing an audio tape recorder capable of recording six-channel audio signals.

Referring now to FIG. 2, while the head 3 or 4 traces the regions A-B, B-C, C-D, D-E, E-F and F-G, audio signals are recorded in areas or channels CH1 to CH6. Each channel is capable of recording the audio signal independently, and so-called azimuth duplicating writing is effected. However, it is not necessary that the channels CH1 to CH6 are on a common straight line. A pilot signal is recorded in each channel for the purpose of tracking control. The recording of pilot signal is conducted in each region in a predetermined rotation ($f_1 \to f_2 \to f_3 \to f_4$). There is no need for specific correlation between channels also in regard to the recording of pilot signals.

It is assumed here that recording or reproduction in and from the channels CH1 to CH3 is conducted while the tape 1 is running in the direction of arrow 7 in FIG. 1, while the recording or reproduction in and from the channels CH4 to CH6 is conducted while the tape is running in the direction of arrow 9 in FIG. 1. In such a case, as shown in FIG. 2, the degree of inclination of the tracks in the channels CH1 to CH3 and that of the tracks in the channels CH4 to CH6 are somewhat different from each other. However, the difference in the relative speed caused by the running of the tape 1 is extremely small as compared with that caused by the rotation of the heads 3 and 4 and, therefore, is considered as being negligible.

FIG. 3 is a time chart of the recording and reproducing operation performed by the tape recorder explained in connection with FIGS. 1 and 2. In FIG. 3, (a) represents phase detecting pulse (referred to as "PG(a)", hereinafter) which is switched between high level (H) and low level (L) for each 1/60 second. Thus, the phase detecting pulse PG is a rectangular wave pulse having a frequency of 30Hz. On the other hand, (b) represents PG (referred to as "PG(b)" hereinafter) which has a polarity inverse to that of PG(a). It is assumed here that PG(a) takes the H level while the head 3 rotates from the point B to the point G in FIG. 1, while PG(b) takes a low level while the head 4 rotates from the point B to the point G.

In FIG. 3, (c) represents data reading pulses which are derived from PG(a). Audio signals corresponding to the period corresponding to one field (1/60 second) of video signal are sampled for every other field when this pulse takes high level H. The signal represented by (d) in FIG. 3, when it takes the high level H, conducts various signal processings such as addition of a redundant code for error correction by means of a RAM, for example, to the sampled one-field audio data, or rearrangement of the audio data. The data to be recorded, obtained through the signal processing explained above, is recorded in the tape 1 in the periods in which a signal shown at (e) in FIG. 3 takes high level H.

The flow of signal in relation to time will be explained with reference to FIG. 3. The data signal sampled in the period between the moments t1 and t3 in which the head 3 moves from the point B to the point G is processed in the period between the moments t3 and t5 in which the head 3 moves from the point G to the point A, and is recorded in the period between the moments t5 and t6 in which the head 3 moves from the point A to the point B. Namely, the data signal is recorded in the channel CH1 by the head 3. On the other hand, the data signal sampled in the period in which PG(b) takes the high level is processed in the similar timing and is recorded in the channel CH1 by the head 4.

In FIG. 3, (f) shows PG (referred to as "PG(f)" hereinafter) which is obtained by shifting PG(a) by a predetermined phase amount which is, in this case, 36° amounting to one channel.

An explanation will be given hereinunder as to the manner in which the audio signal is recorded by PG(f) and a PG (not shown) which has a polarity reverse to that of PG(f). Referring to FIG. 3, the data signal sampled in the period between the moments t2 and t4 is processed in the period between the moment t4 and t6, in accordance with a signal shown at (g) in FIG. 3, and is recorded in the period between the moments t6 and t7 in accordance with a signal shown at (h) in FIG. 3. Namely, the recording is conducted by the head 3 in the channel CH2 shown in FIG. 2, during the period in which the head 3 traces the region between B and C. Similarly, the data signal sampled in the period between the moments t4 and t7 is recorded in the channel CH2 by means of the head 4.

A description will be made hereinunder as to the operation for reproducing the signal recorded in the channel CH2.

The reading of the data from the tape 1 by the head 3 is conducted in the period between the moment t6 and t7, as well as in the period between the moments t1 and t2, in accordance with the signal shown at (h) in FIG. 3. Then, a signal processing which is reverse to that conducted during recording is performed in accordance with a signal shown at (i) in FIG. 3, in the period between the moments t7 and t8, as well as in the period between the moments t2 and t3. Namely, an operation including the error correction is conducted in these periods, and the reproduced audio signal is output in the periods between the moments t8 and t9 and between the moments t3 and t6, in accordance with the signal which is shown at (j) in FIG. 3. Meanwhile, reproducing operation by the head 4 is conducted at 180° phase interval with respect to the reproducing operation performed by the head 3, so that a continuous reproduction of audio signal is performed.

Needless to say, the recording and reproducing operations explained above are conducted also with the channels CH3 to CH6, through n×36° phase shifts of PG(a). It is to be noted also that the recording and reproducing operations have no dependency on the direction of running of the tape.

An explanation will be given hereinunder as to an example of data formatting operation which has been conventionally used in the recording and reproducing apparatus of the kind described. FIG. 4 shows an example of the data format containing PCM audio data corresponding to audio signals of two channels of 1/60 seconds, which data format is recorded in each track of each channel in FIG. 2.

A data matrix shown in FIG. 4, has synchronizing data columns SYNC, address data columns ADDRESS, error correction redundant data columns P and Q, check code data columns CRCC known per se, and data columns D1, D2 each having a plurality of rows and each containing 2-channel audio information signal. The data matrix also has lines b(o) to b(3x−1). The arrangement is such that each line constitutes a data block. Data blocks thus formed are successively recorded such that the recording is commenced first with the leftmost data block and then the right blocks are successively recorded. For instance, the data in the ADDRESS column of the line b(o) is recorded subsequently to the recording of the SYNC data, and then the data in the column P of the line b(o) is recorded. Similarly, the data in the SYNC column of b(e+1) is recorded subsequently to the recording of the data in the final column of the line b(e). Thus, the recording of data contained in one track is completed when the data in the final column of the line b(3x−1) is finished.

The six data in the first one of the rows contained by the data column D1 in the lines b(0), b(1), b(x), b(x+1), b(2 x) and b(2x+1), i.e., the data ID0 to ID5, are the data corresponding to added information other than the audio signals, and will be generally referred to as "ID data", hereinafter.

In general, a multi-channel digital audio tape recorder of the type described functions to enable the channels to be changed during recording or reproduction. Such a function is very important because it enables the recording time to be prolonged. In order that such a function is successfully performed, it is necessary that the data such as the position on the track at which the recording is finished before the changing of the channel, the number of the new channel, i.e., the channel to which the recording operation is to be changed, signal recording direction in the new channel, the point at which the recording is commenced, and the speed of running of the tape are recorded in the old channel, i.e., the channel from which the recording operation is to be changed-over to the new channel.

The tape recorder of this type is usable also as a VTR, as is well known. In order to enable the discrimination between the video signal and the audio signal, therefore, it has been a common measure to superpose, only on the digital audio signal, a pilot signal having a frequency $f_5$ which is different from four kinds of pilot signal used in known 4-frequency type tracking control.

FIG. 5 shows the frequencies of these pilot signals, while FIG. 6 shows a detecting circuit for detecting the pilot signal $f_5$.

Referring first to FIG. 6, the synthetic signal reproduced by the head 30 is amplified by a head amplifier, and the amplified signal is made to pass through a bandpass filter (BPF) 32 which has the central frequency equal to the frequency $f_5$ of the pilot signal, so that only the signal component of the frequency $f_5$ is extracted. This signal is sent to a detector (DET) 33 for level detection. When the level is higher than a reference voltage $V_{ref}$, a comparator 34 outputs high level H of binary signal.

When the signal of the frequency $f_5$ is detected during reproduction or searching in one of six channels, it is decided that the channel from which the signal of the frequency $f_5$ is detected is the channel in which the audio signal has been recorded.

In the conventional apparatus, the signal of the frequency $f_5$ enables only the confirmation of the fact that the recording of the multi-channel digital audio signal has been completed. The searching through recording programs, however, is extremely difficult to conduct if the search is to be conducted only by means of the confirmation of the presence of the digital audio signal, considering that the number of the channels is as large as six.

It is, therefore, desirable that the information concerning the change-over between the channels be written as ID data during the recording.

FIGS. 7(a) and 7(b) show an example of the setting pattern for setting the manner in which six programs are automatically recorded by using devices such as a timer device.

It is conceiveable that 6 channels are used in such a manner that each channel has one program, as shown in FIG. 7(a). This pattern will be referred to as "parallel setting pattern" hereinafter. In another pattern which will be referred to as "series setting pattern", all the programs are handled in series in such a manner that the first channel contains the programs as much as possible starting with the first program. If the first channel is filled up, the overflow of the programs are stored in the second channel and any overflow is contained in the third channel. In this manner, the series of programs down to the sixth program is stored.

These setting patterns are only illustrative, and other setting patterns can be used equally well. All these setting patterns, however, encounter the following problem. Namely, it is generally difficult to detect, when change-over of the channels has been conducted in a multi-channel recording and reproducing apparatus, the point on the old channel at which the recording was ceased and the point on the new channel at which the recording was commenced. This problem can be overcome by providing data concerning the change-over of the channel in the ID data area.

However, the writing of the channel change-over data in the ID data area in the conventional apparatus requires a specific manual operation. In fact, it is quite difficult to record the data concerning the change-over of the channels during automatic recording conducted by means of a timer device.

When conducting an automatic recording by means of a timer device, a problem is encountered as to the necessity for the judgment concerning the allocation of the programs to the tracks, i.e., as to which one or ones of the tracks the program is to be recorded.

Another problem is that, when a plurality of programs including programs of video signal and the recording programs having only audio signals are to be recorded by means of a timer, it is not possible to attain a high rate of utilization of the tape, if the selection of channels is conducted by a mere time-shifting type method. In order to enable the tape to be fully used, a complicated control is necessary for the purpose of setting of the recording positions. Summary of the Invention:

Accordingly, an object of the present invention is to provide a multi-channel recording apparatus capable of overcoming the above-described problems of the prior art.

Another object of the present invention is to provide a multi-channel recording apparatus which is suitable for use in automatic recording by means of a timer device.

Still another object of the present invention is to provide a multi-channel recording apparatus which is easy to operate and which facilitates searching of recorded information.

To these ends, according to the present invention, there is provided an information signal recording apparatus comprising: recording means capable of recording pieces of information in a plurality of channels on a recording medium; setting means for setting the time of completion of recording and the channel of recording for each of first and second programs to be recorded; memory means for storing, for each of the first and second programs, first information pertaining to the recording channel and second information pertaining to the time of completion of recording; selecting means for selecting, out of the plurality of channels, the channels in which the information signal is to be recorded by the recording means, the selecting means being adapted to select, in accordance with the first information, the channels in which the information signals concerning the first and second programs are to be recorded; and causing means for causing, when the recording means is recording the information signal pertaining to the first program, the recording means to record, together with the information signal, said first information pertaining to the second program stored in the memory means in accordance with the second information pertaining to the first program.

A further object of the present invention is to provide a multi-channel recording apparatus which enables a recording medium such as a tape to be fully used.

To this end, the present invention provides an information signal recording apparatus comprising: recording means capable of recording pieces of information in a plurality of channels which are provided in a parallel fashion on a recording medium so as to extend in the longitudinal direction of the recording medium; first setting means for setting the time of start of recording and the time of completion of recording for each of a plurality of programs including a program pertaining to first information which is to be recorded by said recording means in only one of the plurality of channels and a program pertaining to information which is to be recorded over at least two of the plurality of channels; and second setting means for setting the position of recording of the program pertaining to the second information in advance of the setting of the position of recording of the program pertaining to the first information.

Other objects, features and advantages of the present invention will become clear from the following description of the preferred embodiments taken in conjunction with the accompanying drawings.

Brief Description of the Drawings

FIG. 6 is a circuit diagram of a detecting circuit for detecting a pilot signal recorded in a tape;

FIGS. 7(a) and 7(b) are illustrations of recording patterns for recording programs;

FIG. 9 is an illustration of the format relating to mode 7 of ID data used in the tape recorder shown in FIG. 8;

FIGS. 10 and 11 are illustrations of whole format of ID data in the recorder shown in FIG. 8;

FIGS. 14(a) to 14(d) are illustrations of operation in accordance with the flow shown in the flow chart of FIG. 13.

Detailed Description of Preferred Embodiments

Figure 8:
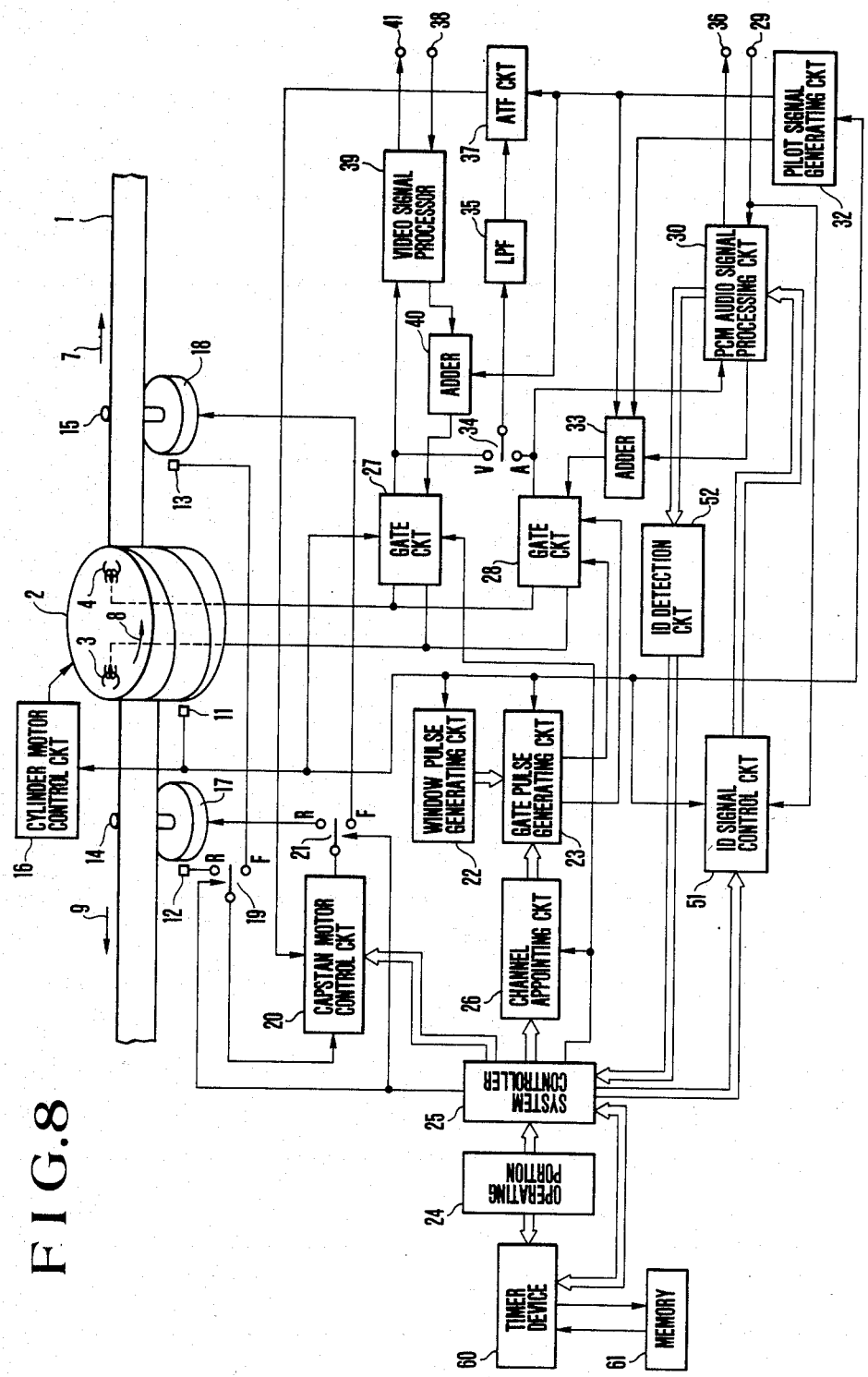
FIG. 8 is a schematic illustration of the construction of a tape recorder as an embodiment of the present invention.

FIG. 8 schematically shows the construction of a tape recorder as an embodiment of the present invention. In this Figure, the same reference numerals are used to denote the same parts as those shown in FIGS. 1 to 2.

The PG derived from a rotation detector 11 for detecting the rotation of the rotary cylinder 2 is supplied to a cylinder motor control circuit 16 which operates to control the rotation of the cylinder 2 such as to maintain a predetermined rotation speed and a predetermined phase rotation. Numerals 12 and 13 denote rotation detectors for detecting the rotation of the flywheels 17 and 18 of capstans 14 and 15. The outputs FG from the rotation detectors 17, 18 are selectively supplied to a capstan motor control circuit 20 through a switch 19. The output from the circuit 20 is supplied through a switch 21 to respective capstan motors so as to maintain predetermined speed of rotation of the capstan 14 or 15. The switches 19 and 21 are turned to forward side F when the tape is to run in the direction of the arrow 7 (forward direction) and to the reverse side R when the tape is to run in the direction of the arrow 9 (backward direction).

By manually operating the manual operating portion 24, it is possible to appoint the operation mode such as recording and reproduction, as well as the channel with which the operation is to be conducted. Appointment is made also as to whether the recording is to be conducted only for audio signals or the video signals also are to be recorded. The manual operating portion 24 also enables the user to appoint the track pitch and the tape running direction for the recording.

In addition, the user can appoint through the manual operating portion 24, when he wishes to change the track from one to another, also the track No., tape running direction and the track pitch which are to be employed after the change-over between the tracks.

These data inputted through the manual operating portion 24 are delivered to a system controller 25 which is adapted to control the capstan motor control circuit 20, switches 19, 21, channel appointing circuit 26, gate circuit 27, ID signal control circuit 51, and so forth.

The channel appointing circuit 26 delivers channel appointing data to a gate pulse generating circuit 23, so as to obtain a desired gate pulse. Needless to say, the channel CH1 is appointed in the case where also the video signals are to be recorded.

The gate circuit 28 receives control gate pulses which are window pulses generated by a window pulse generating circuit 22 for each of the heads 3 and 4 in accordance with the channel appointing data.

During recording, the analog audio signal inputted through the terminal 29 is supplied to the PCM audio signal processing circuit 30 and is sampled at the timing related to the window pulse, so as to become a digital data signal which is then subjected to the aforementioned signal processing operation. The ID data mentioned before also is generated simultaneously with the audio data. The thus produced recording audio data is added to tracking pilot signals (TPS) and another pilot signal, by an adder 33. The tracking pilot signal TPS is generated by the pilot signal generating circuit 32 in a frequency rotation of $f_1 \rightarrow f_2 \rightarrow f_3 \rightarrow f_4$. The output of the adder 33 is suitably gated by the gate circuit 28 as explained before, and is written in the desired channels by the heads 3 and 4.

In the reproduction of the signals, the reproduced signals from the heads 3 and 4 are extracted by the gate circuit 28 in accordance with the window pulses, and the reproduced signals are supplied to a low-pass filter (LPF) 35 through the terminal A of the switch 34, as well as to the PCM audio signal processing circuit 30. In the PCM audio signal processing circuit 30, signal processings such as error correction, elongation of the time axis, and digital-to-analog conversion are conducted, whereby reproduced analog audio signal is output from a terminal 36.

The LPF 35 is adapted to separate the TPS and to supply the same to the ATF circuit 37. The ATF circuit 37 is a circuit of 4-frequency type which is known per se and is intended for obtaining tracking error signal. As is well known, this circuit makes use of reproduced tracking pilot signals and pilot signals which are produced by the pilot signal generating circuit in the same rotation as that in the recording. The tracking error signals are obtained for respective channels and, therefore, have to be subjected to a sample-hold circuit. The thus obtained tracking error signals are delivered to the capstan motor control circuit 20 so as to conduct the control of running of the tape 1 in the reproducing mode and, hence, the tracking control by means of the capstan 14, 15.

A description will be made hereinafter as to the function for recording and reproducing video signal. When a command for recording or reproduction of video signal is issued from the system controller 25, the channel appointing circuit 26 forcibly appoints the channel CH1 and activates the gate circuit 27 in accordance with the PG. The video signal received through the terminal 38 is converted by the video signal processing circuit 39 into forms suitable for the recording, and is then supplied to the adder 40. The adder 40 adds this signal to the pilot signal derived from the pilot signal generating circuit 32, and the signal as the sum is delivered to the heads 3, 4 through the gate circuit 27 so as to be recorded in the channels CH2 to CH6. The recording of the PCM audio signal is conducted in the same manner as that of the recording in the channel CH1 explained before.

In the reproduction of the video signal, the video signals picked up by the heads 3 and 4 are formed by the gate circuit 27 into a continuous video signal. This continuous signal is supplied to the video signal processing circuit 39 which converts this signal into original form. The thus obtained signal of original form is output through the terminal 41. The continuous signal derived from the gate circuit 27 is supplied to the LPF 35 through the terminal V of the switch 34.

The pilot signal component is separated by the LPF 35 and the thus separated signal component is delivered to the ATF circuit 37. There is no need for the sample hold of the tracking error signals obtained from the ATF circuit in this state. Thus, the tracking error signals are directly supplied to the capstan motor control circuit 20. Meanwhile, the PCM audio signal also is reproduced so that an analog audio reproduced signal is derived from the terminal 36. In this case, however, tracking control using the output signal from the gate circuit 28 is not conducted.

Figure 1:
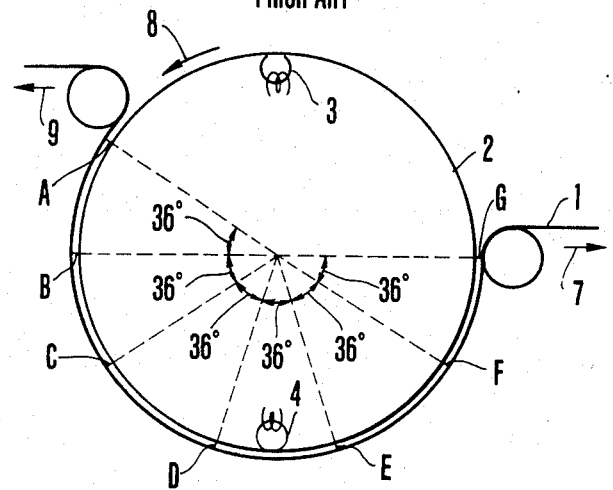
FIG. 1 is an illustration of the tape-running system of a multi-track digital audio tape recorder.
Figure 2:
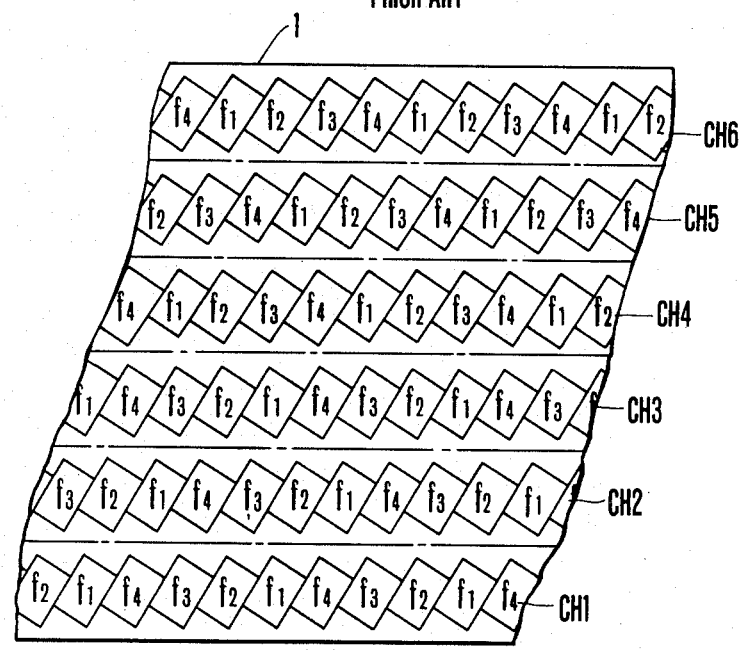
FIG. 2 is an illustration of the pattern of recording performed by the tape recorder shown in FIG. 1.
Figure 3:
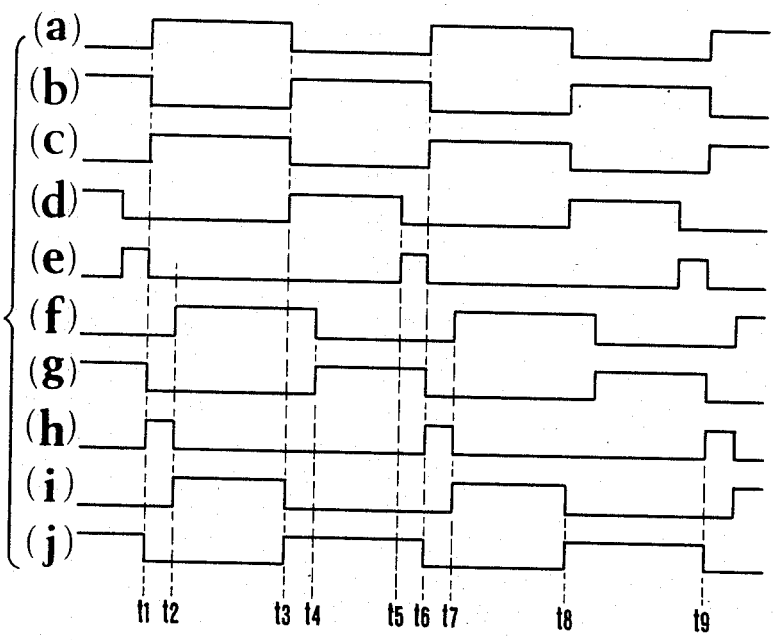
FIG. 3 is a timing chart showing the timing of operation of the tape recorder shown in FIG. 1.
Figure 5:
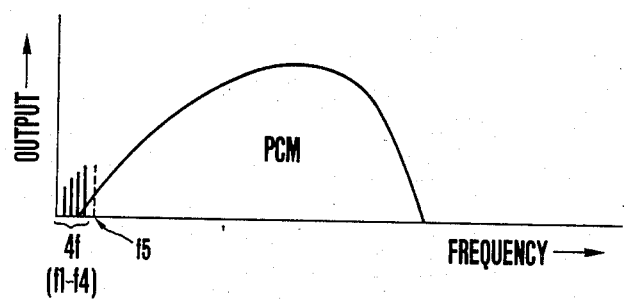
FIG. 5 is an illustration of the frequency arrangement of recorded signals.

A description will be made with specific reference to FIGS. 9, 10 and 11 as to the data ID0 to ID5 shown in FIG. 1.

The data ID0 pertains to the mode No. which shows in what mode the ID word is written. A mode 7 is a mode which is exclusively used for multi-channel digital audio tape recorder. The data ID1 to ID4 have different relations between the mode Nos. and the contents defined by the mode Nos. The data ID5 pertains to an essential information common to all modes. The detail is shown in FIG. 11 for each bit and will be explained later.

An explanation will be made hereinafter with reference to FIG. 9 as to ID0 to ID4 in the mode 7 for multi-channel tape recorder.

Referring to FIG. 9, 0 to 7th bits of the data ID0 represents "7" which is the mode No.

The 7th bit of the data ID1 is a bit in which "0" is written during ordinary recording period and "1" is written during a predetermined period (0.3 to 1.0 second) immediately before the change-over of the recording channel. Since this point constitutes a feature critical to the present invention, a detailed description will be made in this connection below.

During ordinary recording, "0" is written in the 7th bit. Meanwhile, the 0th bit indicates the tape running direction, in consideration of possibility of so-called reverse recording. The 1st and the 2nd bits represent the tape running direction. The 3rd bit always keeps "1". The 4th, 5th and 6th bits show signals which are used for the purpose of retrieval of the content of record. In the 7th bit, "1" is maintained for a period between the moment which is 1 to 0.3 second before the change-over of the channel and the moment at which the recording is completed in the channel from which the recording is to be switched to a new channel.

In this period in which "1" is maintained in the 7th bit, the 0th bit holds a sign which indicates the direction of running of the tape during recording, as in the ordinary recording period. The 1st to 3rd bits show the number of the new channel to which the recording is changed-over. The 4th bit is always maintained at "1", while the 5th bit indicates the position along the length of the tape at which the recording is commenced after the change-over of the channel. Namely, the 5th bit holds an information for discriminating whether the recording should be commenced from the tape position which has been reached immediately before the change-over of the channels or from either one end of the tape. The 6th bit represents the tape running direction after the change-over of the channel.

The data ID2 and the data ID3 are selectively used for the purpose of counting and recording the date, month and year, day of week and second, minute and hour, by using mainly the 7th bit as the control data. The data ID4 represents the program No. or C number (general expression inclusive of Chapter, Cut and Cue), fro 0 up to 79.

In FIG. 10, Pro./No. represents the program No., Cut/No. represents the cut No. and Frame/No. represents the frame No.

An 8-bit data indicated by Y in FIG. 8 carries an information which is shown in FIG. 11. Y represents the data of ID5 in each of modes 1 to 7. The 0th bit of the data Y represents whether the 8-bit data Y itself is valid or not. The 1st and 2nd bits show the forms of the audio signal to be recorded in the aforementioned two channels, e.g., whether the audio information is monoral or stereo. The 3rd and the 4th bits represent whether the information to be recorded in the corresponding portions of the 1st and the 2nd channels are audio signal information or another type of information. The 5th and the 6th bits are adapted for holding data which assumes "1" at the positions where the recording of an audio signal is commenced and ceased, respectively, while the 7th bit is adapted to hold data which assumes "1" when it is desired to prevent dubbing.

A brief explanation will be given hereinunder as to the recording of the ID data.

Figure 12:
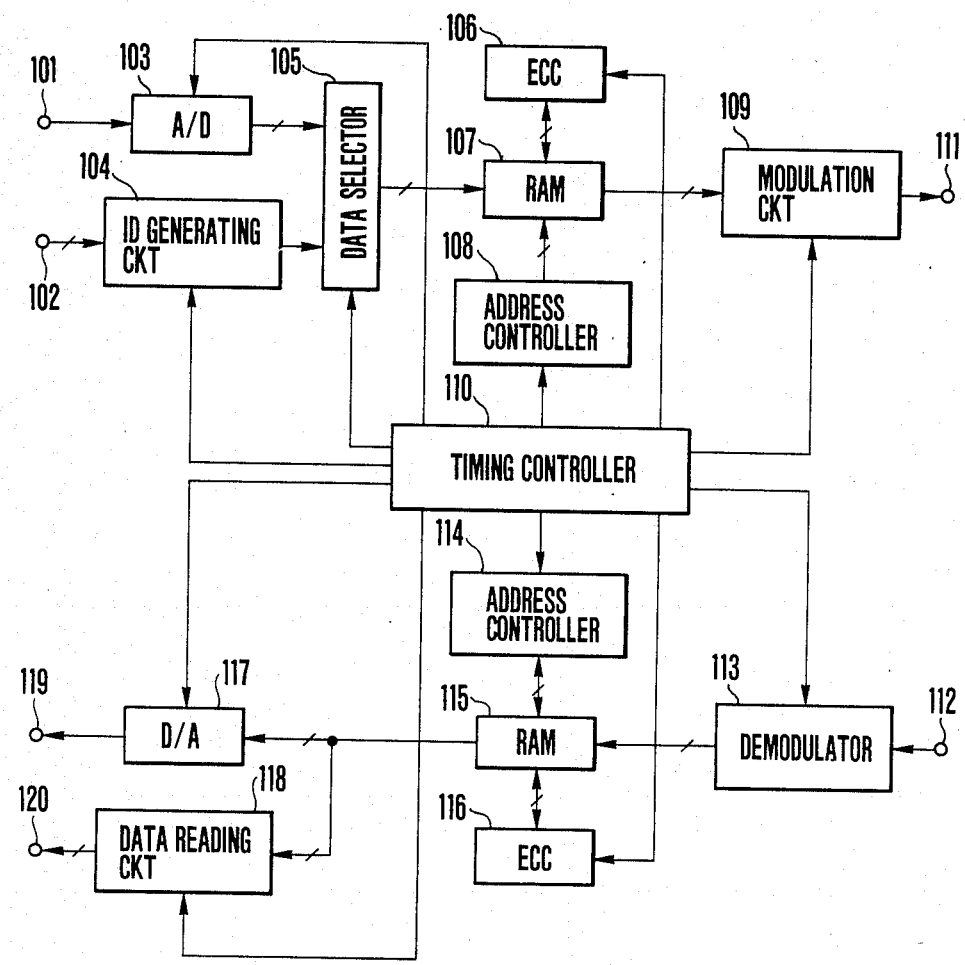
FIG. 12 is an illustration of an example of the PCM audio signal processing circuit shown in FIG. 8.

FIG. 12 illustrates a practical example of the PCM audio signal processing circuit 30 shown in FIG. 8. In FIG. 12, a numeral 101 denotes a terminal for receiving an input analog audio signal, while 102 represents a terminal to which the output data from the ID control circuit 51 is delivered. The parallel data supplied to the terminal 102 is fed to the ID generating circuit 104 which produces a serial data at a predetermined timing.

Meanwhile, the analog audio signal delivered to the terminal 101 is fed to an analog-to-digital converter (A/D) converter 103. The A/D converter 103 is adapted to quantitize the analog audio signal after sampling at a predetermined timing. The data selector 105 delivers, once in each field period and at a timing corresponding to the data ID1, the output from the ID data generating circuit 104 to the RAM (Random Access Memory) 107. At another timing, the data selector 105 delivers the output from the A/D 103 to the RAM 107.

Figure 4:
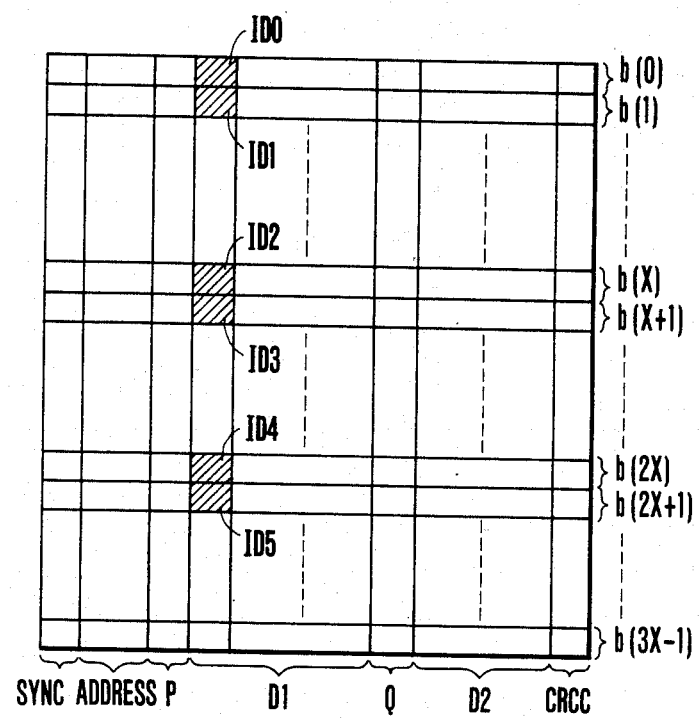
FIG. 4 is an illustration of data format recorded in one track in each channel.

The RAM 107 then rearrange various data into a form corresponding to the data matrix shown in FIG. 4. These various data include parity word (P,Q) derived from the error correcting circuit (ECC) 106, address data such as CRCC derived from the address controller 108, and the data derived from the data selector 105. The RAM 107 delivers the data compressed in terms of time axis to a modulating circuit 109 which conducts a digital modulation such as BPM (Bi Phase Modulation) and outputs the modulated signal through a terminal 111. The digital-modulated audio signal derived from the terminal 111 is then supplied to the adder circuit 33 as explained before.

A description will be made hereinunder as to the operation during reproduction. The digital-modulated signal supplied to the terminal 112 is demodulated by a digital demodulator 113 and is supplied to a RAM 115. The RAM 115 is adapted to conduct a signal processing which is completely reverse to that performed by the RAM 107. Namely, the data are rearranged in accordance with the address data given by the address controller 114 and synchronizing data, and error correction is performed by an ECC 116. The data derived from the column D1 and the column D2 are output from the RAM 115 and is supplied to a D/A (digital-to-analog converter) 117 and to a data reading circuit 118.

More specifically, the D/A restores the original analog audio signal and delivers the same from the terminal 36 shown in FIG. 8, via a terminal 119. On the other hand, the data reading circuit 118 picks up the aforementioned ID data and supplies the same to the ID detecting circuit 52. The operation of respective portions of the signal processing circuit shown in FIG. 12 are synchronized by timing signals delivered from the timing controller 110.

The ID detecting circuit 52 conducts a retrieval of ID data and supplies pieces of information as those shown in FIGS. 9, 10 and 11 to the system controller 25. The system controller 25 then controls the channel appointing circuit 26 and the capstan motor control circuit 20 in accordance with these data.

A description will be made below as to the manner in which automatic recording by a timer device is conducted with the described tape recorder.

Referring to FIG. 8, setting of the program for recording by timer device is conducted through the manual operating portion 24. Actually, this is conducted by a timer device 60 which has a memory 61 adapted for storing the content of the program. The memory 61 is capable of storing various data items such as the program No., starting data and time, finishing data and time, input source, recording channel No., and jump flag which will be explained later. Some of these items are not directly inputted through the manual operating portion. For instance, the jump flag may be a 1-bit information which takes high level H when the recording channel is to be changed upon completion of the recording and low level L when the channel is not to be changed, i.e., when the next program is to be recorded in the same channel. In such a case, this information may be manually set through the manual operating section at the time of setting of the timer. In the described embodiment, however, the setting may be conducted automatically by the system controller 25.

Hitherto, the recording region No. has been determined and input by the users. In this embodiment, however, the determination of the recording channel No. is conducted automatically by using an algorithm which will be explained below with reference to FIG. 13 and FIGS. 14(a) to 14(d).

Figure 13:
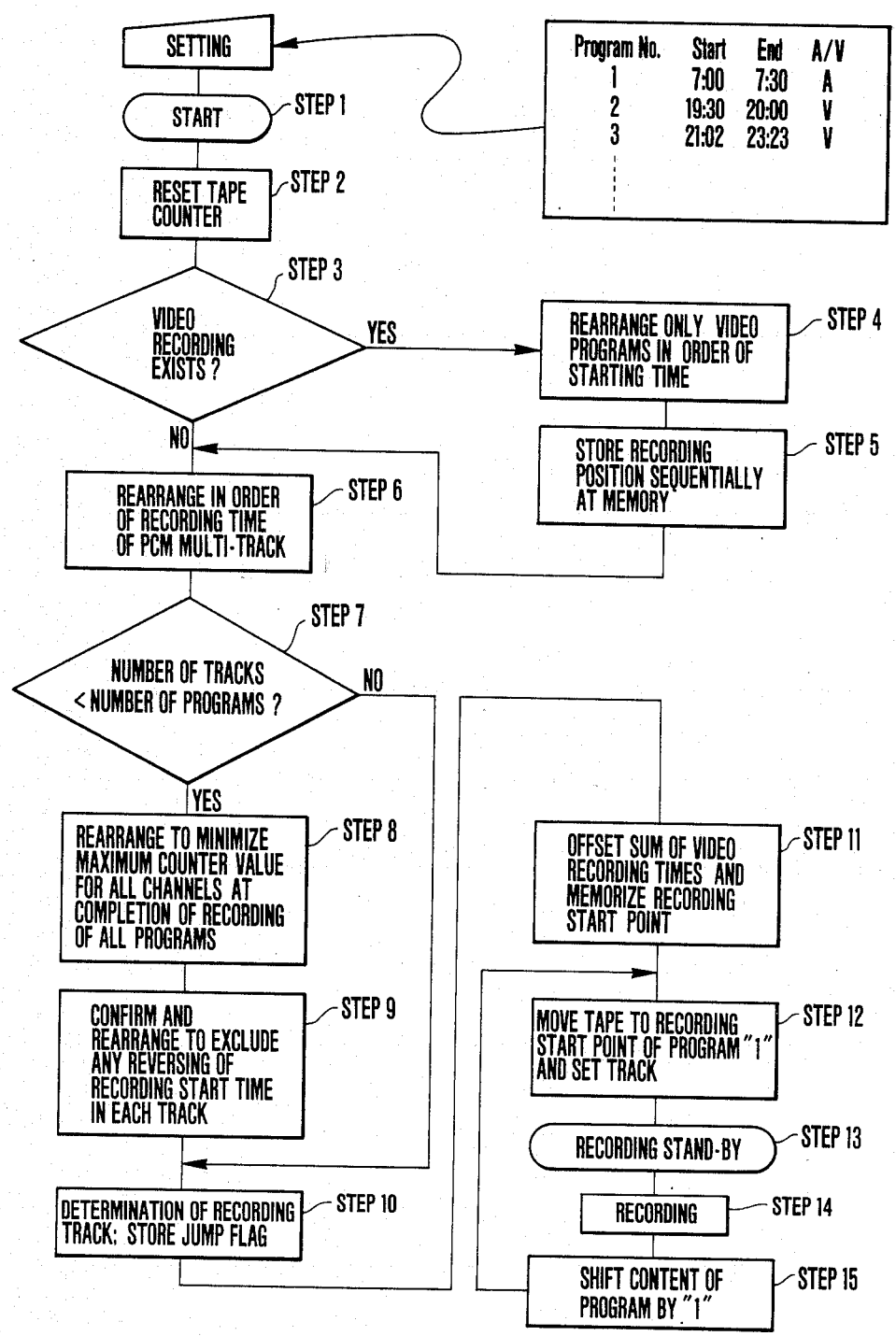
FIG. 13 is a flow chart illustrating the operation of a system controller shown in FIG. 8.

FIG. 13 is a flow chart showing the operation of the system controller performed when the recording by means of a timer device is conducted with the apparatus shown in FIG. 8, while FIGS. 14(a) to 14(d) are illustrations of operation shown in FIG. 13.

First of all, starting and stopping times are set for each program to be recorded. A timer picture recording switch is turned on in this state, so that the operation is started (Step 1). Preferably, the tape counter is of the type which disp;ays the real time. The tape counter is reset so as to use the present tape position as the reference position (Step 2). Then, a judgment is conducted as to whether any video program exists in the programs which are set before (Step 3). If there are some video programs, the sequence of the video programs is rearranged in the timer order, i.e., the later program is set after the earlier program (Step 4). Then, recording positions are set along the length of the tape-like recording medium. This setting of positions is made in terms of the content of the tape counter. Thus, the content of the tape counter is progressively increased from "0" (Step 5). Once the operation through Steps 1 to 5 is over, the program setting has to be done for the programs which contains only audio signals. Thus, the subsequent operation is the same as that to be performed when the programs include no video program. Namely, the programs containing only audio signals are rearranged in the order of time length, i.e., such that shorter one comes next to the longer one, and are allotted to channels CH1 to CH6 as shown in FIG. 14(a)(Step 6). Then, a comparison is made between the number of the programs and the number of channels (Step 7). If the number of the channels is exceeded by the number of programs, an operation is conducted to rearrange the programs such that the maximum counter value throughout the recording of all programs is minimized (Step 8).

Various kinds of information such as the time lengths of programs, channel Nos. and so forth are formed into a data as shown in FIG. 14(b) which is stored in a memory. Other kinds of information such as the thus determined channel Nos., recording start positions and so forth are formed into a data as shown in FIG. 14(b) and is stored in the memory.

Finally, a step is followed for confirming that there is no reversing of recording time sequence in each channel. If there is any reversing of the recording time sequence, the sequence of the programs is changed such as to enable the programs to be recorded along the signals in the tape as shown in FIGS. 14(c) and 14(d) (Step 9), whereby the recording tracks are determined (Step 10).

Then, the recording starting position is stored after subtraction of the sum of the recording time lengths of the video programs (Step 11). Thereafter, the program Nos. are successively shifted to smaller side each time a timer recording of one program is executed. Thus, the recording is always conducted for the first program (Step 12). Preparation for the recording is thus completed (Step 13) and recording operation is conducted (Step 14) in a manner which will be explained later. After the completion of the recording, the program Nos. are updated by one (Step 15) and the recording is commenced with the next first program.

In Step 10, the aforementioned jump flag is raised for respective programs and, in accordance with the raised jump flags, the recording channel Nos. are recorded in Step 14, thereby facilitating retrieval for the reproduction. As stated before, the jump flag is a 1-bit information which takes H level when the channel is to be changed from one to another and L level when the next program is to be recorded in the same channel. The storage of this information is automatically conducted by means of a system controller.

Figure 15:
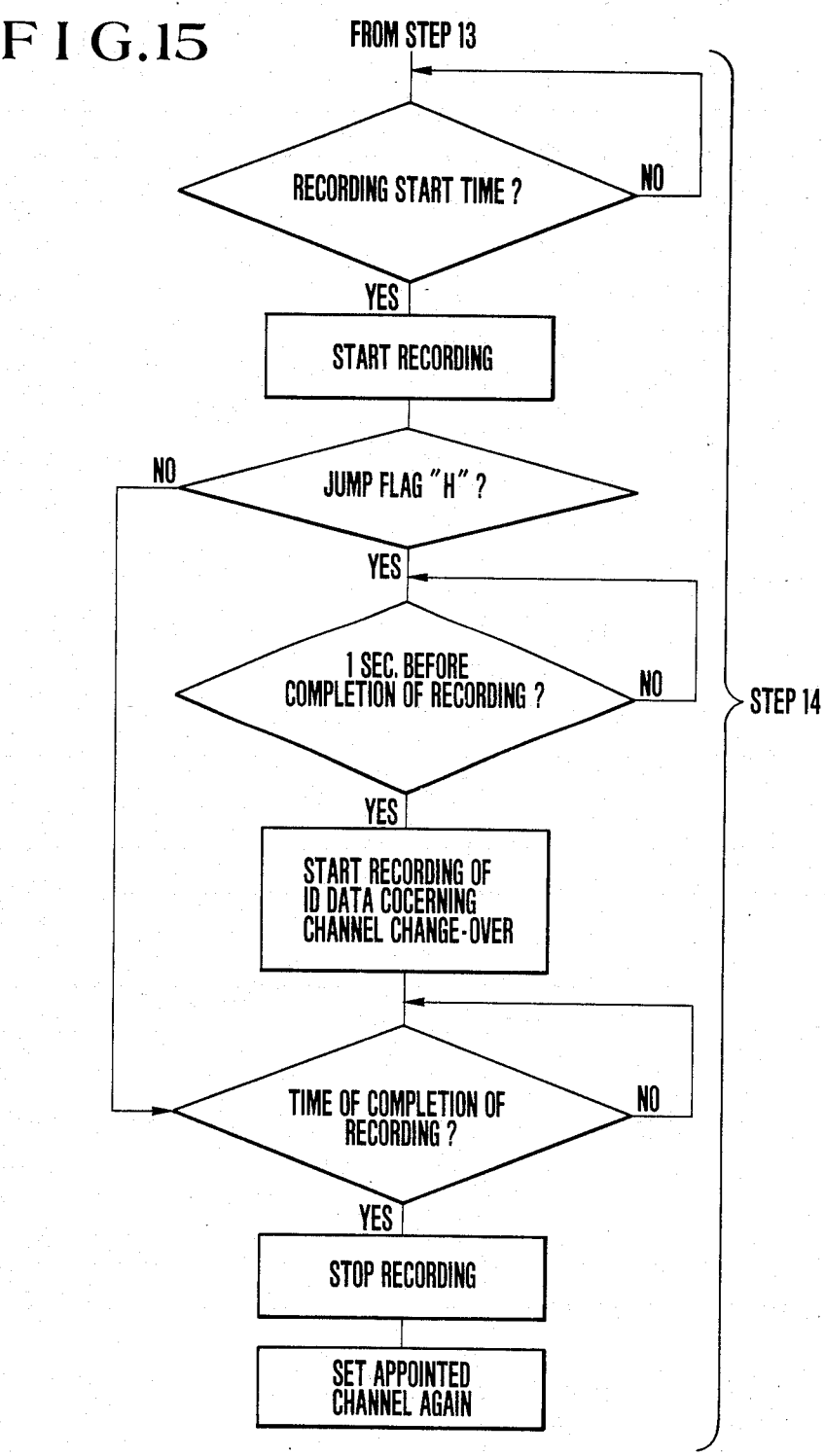
FIG. 15 is a flow chart showing the flow of a part of operation shown in FIG. 13.

The recording routine performed in Step 14 of the flow shown in FIG. 13 will be explained in connection with FIG. 15.

When the recording is commenced with a program, the jump flag of this program is read on the basis of the time from the moment at which the recording is commenced. If the thus read flag is L, a recording stopping operation is executed when the recording time is over, and the operation is suspended until the time of execution of the next program.

Conversely, if the jump flag is H, the recording of ID data concerning the change of the recording channel is commenced at a suitable timing in a period between 1 to 0.3 second before the recording completion time given by the recording completion data stored in the memory.

It is necessary that the content to be written in the ID data contains at least the No. of the channel in which the next program is to be recorded. Needless to say, other kinds of data set in the mode 7 explained before may be also recorded in the ID data.

The writing of the information in the ID data pertaining to the change of the channel is carried out as follows. As the first step, the system controller 25 demands the timer device 60 for the reading of the jump flag, and confirms that the level of the flag is "H". Then, the system controller 25 reads the data which contains at least the No. of the channel after the change-over of the channel, from the group of program information. The thus read data is converted in conformity with the format as shown in FIG. 9, and is recorded together with the digital audio data. The above-described operation of the system controller will be understood from a flow chart shown in FIG. 15.

After the start of the recording of the ID data pertaining to the change of the recording channel, the recording operation is suspended for 1 second. The apparatus, however, does not wait for the execution of the next program in this state but, rather, the process returns to Step 11. In this Step 11, the channel appointing circuit 26 is operated in accordance with the data pertaining to the recording channel after the change-over. The apparatus is then allowed to wait for the execution of the next program. If the apparatus is set in the waiting condition without the operation of the channel appointing circuit 26, the following problem is encountered. Namely, if a program which has not been set in the memory is recorded regardless of the set program which is to be recorded next, since the ID data solely cannot be rewritten, the content of the ID data and the content of the actual recording do not correspond to each other.

Furthermore, the data representing the tape running direction and the recording starting position, i.e., the data on the 5th and 6th bits of the mode 7 in the ID data are read and the change-over of the channel is conducted in accordance with the thus read data, followed by the driving of the tape to the position at which the recording is to be commenced. The change-over of the channel and the positioning of the tape are preferably conducted before the apparatus is turned into the waiting condition, in order to enable a precise determination of timing at which the recording is to be commenced, considering that the time required for the running of the tape to the recording start position is rather uncertain.

What is claimed is:

1. An information signal recording apparatus arranged to record first and second programs each of which respectively includes a series of information signals, comprising:

(a) recording means capable of recording the information signals in each of a plurality of channels on a recording medium;

(b) setting means for setting the time of completion of recording and the channel of recording for each of said first and second programs to be recorded;

(c) memory means for storing, for each of said first and second programs, a first information indicating the recording channel and a second information indicating the time of completion of recording;

(d) selecting means for selecting, among said plurality of channels, the channels in which information signals are to be recorded by said recording means, said selecting means being adapted to select, in accordance with said first information, the channels in which the information signals corresponding to said first and second programs are to be recorded; and (e) causing means for causing, while said recording means is recording the information signals corresponding to said first program, said recording means to record, together with the information signals, said first information pertaining to said second program stored in said memory means for a predetermined period in accordance with said second information pertaining to said first program.

2. An apparatus according to claim 1, wherein said predetermined period is set immediately before the time at which the recording of said first program is completed.

3. An apparatus according to claim 1, wherein said setting means is adapted to set the sequence of recording such that the recording of said first program is conducted in advance of the recording of said second program.

4. An apparatus according to claim 3, further comprising prohibiting means for prohibiting, while the recording channels set by said setting means for both programs are the same, the recording of said first information pertaining to said second program.

5. An apparatus according to claim 1, wherein said recording medium is a tape-like medim and said plurality of channels respectively extend in the longitudinal direction of said recording medium.

6. An apparatus according to claim 5, wherein said recording means includes a head which obliquely traces said recording medium.

7. An apparatus according to claim 1, wherein said causing means includes means for mixing said information signals and said first information in a time sharing manner.

8. An apparatus according to claim 7, wherein both of said information signals and said first information are digitally coded.

9. An apparatus according to claim 8, wherein said information signals include digital audio signals.

10. An information signal recording apparatus comprising:

(a) recording means capable of recording information signals in each of a plurality of channels on a recording medium;

(b) selecting means for selecting, among said plurality of channels, the channel in which said information signals are to be recorded by said recording means;

(c) setting means for setting the change-over time of change-over of said channel selected by said selecting means; and (d) causing means for causing said recording means to record the information which indicates the channel to be selected by said selecting means after said change-over time, for a predetermined period immediately before said change-over time.

11. An apparatus according to claim 10, wherein said setting means is capable of setting also the channels to be selected before and after said change-over time.

12. An apparatus according to claim 11, wherein said causing means includes means for storing information indicating the channels set by said setting means.

13. An apparatus according to claim 10, wherein said recording medium is a tape-like medium and said plurality of channels respectively extend in the longitudinal direction of said recording medium.

14. An apparatus according to claim 13, wherein said recording means includes a head which obliquely traces said recording medium.

15. An information signal recording apparatus arranged to record a plurality of programs each of which includes a series of information signals, comprising:

(a) recording means capable of recording information signals in each of a plurality of channels which respectively extend in parallel on a tape-shaped recording medium in the longitudinal direction of said recording medium;

(b) first setting means for setting the time of start of recording and the time of completion of recording for each of said plurality of programs including a first program which is to be recorded by said recording means in only one of said plurality of channels and a second program which is to be recorded over at least two of said plurality of channels; and (c) second setting means for setting the position of recording of said second program in advance of the setting of the position of recording of said first program.

16. An apparatus according to claim 15, wherein said second setting means is arranged such that it sets, for said first program, the channel in which said first program is to be recorded and the recording position along the length of said tape-shaped recording medium, and, for said second program, only the recording position along the length of said tape-shaped recording medium.

17. An apparatus according to claim 16, wherein said plurality of programs include a number programs of diverse recording periods and which are respectively to be recorded by said recording means in only one of said plurality of channels, said second setting means being arranged such that it sets the recording positions of said number of programs in such a sequence that the recording position for the program having shorter recording period comes next to that for the program having the longer recording period.

18. An apparatus according to claim 17, wherein said second setting means is arranged to set the recording channels for said programs pertaining to said first information such that the longest one of the recording periods for said plurality of channels becomes shorter.

19. An apparatus according to claim 15, wherein said first program includes a series of audio signals, while said second program includes a series of video signals.

20. An apparatus according to claim 19, wherein said recording means has a head capable of tracing said recording medium obliquely.

21. An information signal recording apparatus arranged to record a plurality of programs each of which includes a series of information signals comprising:

(a) recording means capable of recording information signals in each of a plurality of channels which respectively extend in parallel on a tape-like recording medium in the longitudinal direction of said medium;
(b) first setting means for setting the recording start time and recording completion time for each of said plurality of programs to be recorded; and
(c) second setting means for setting the recording position for said plurality of programs in such a sequence that the recording position for a program having a shorter recording period comes next to that for a program having a longer recording period.

22. An apparatus according to claim 21, wherein said second setting means is arranged to set, for each of said programs, the channel in which each program is to be recorded and the recording position for each program along the length of said tape-like recording medium.

23. An apparatus according to claim 22, wherein said second setting means conducts the setting of said channel in which said each program is to be recorded, in advance of the setting of the recording position along the length of said recording medium.

24. An apparatus according to claim 23, wherein said second setting means is arranged to set the recording channels for said programs such that the longest one of the recording periods for said plurality of channels becomes shorter.

25. An information signal recording apparatus arranged to record a plurality of programs each of which respectively includes a series of information signals, comprising:
(a) recording means capable of recording information signals in each of a plurality of channels which respectively extend in parallel on a tape-like recording medium in the longitudinal direction of said medium;
(b) first setting means for setting the recording start time and recording completion time for each of said plurality of programs to be recorded; and
(c) second setting means for setting the recording channels for said plurality of programs such that the longest one of the recording periods for said channels becomes shorter.

* * * * *